(12) United States Patent
Badillo

(10) Patent No.: US 8,496,146 B2
(45) Date of Patent: Jul. 30, 2013

(54) CONVERTIBLE VEHICLE STORAGE RACK

(75) Inventor: Paul Badillo, Littleton, CO (US)

(73) Assignee: Intelligent Designs 2000 Corp., Aurora, CO (US)

( * ) Notice: Subject to any disclaimer, the term of this patent is extended or adjusted under 35 U.S.C. 154(b) by 286 days.

(21) Appl. No.: 12/861,034

(22) Filed: Aug. 23, 2010

(65) Prior Publication Data

US 2011/0101057 A1    May 5, 2011

Related U.S. Application Data

(60) Provisional application No. 61/237,177, filed on Aug. 26, 2009.

(51) Int. Cl.
*B60R 9/045* (2006.01)
*B60R 9/04* (2006.01)

(52) U.S. Cl.
USPC ........... 224/321; 224/310; 224/325; 224/558; 414/462

(58) Field of Classification Search
USPC .............. 224/321, 42.28, 282, 309, 310, 319, 224/325, 330, 492, 495, 497, 502, 504, 505, 224/506, 507, 508, 513, 515, 518, 558; 414/462; 296/3; 248/229.15, 231.71
IPC ................................................ B60R 9/045,9/04
See application file for complete search history.

(56) References Cited

U.S. PATENT DOCUMENTS

| | | | |
|---|---|---|---|
| 704,436 A | 7/1902 | Cluff | |
| 744,113 A | 11/1903 | Rye | |
| 1,564,776 A | 12/1925 | Green | |
| 1,606,954 A | 11/1926 | Moen et al. | |
| 2,387,779 A | 10/1945 | Strauss | |
| 2,492,841 A * | 12/1949 | Burkey | 414/462 |
| 2,521,815 A * | 9/1950 | Will | 5/119 |
| 2,663,472 A | 12/1953 | Belgau | |
| 2,784,888 A | 3/1957 | Lecanu-Deschamps | |
| 2,800,264 A * | 7/1957 | McFadyen | 224/504 |
| 2,967,635 A * | 1/1961 | Barnett | 414/462 |
| 3,158,301 A * | 11/1964 | Hedgepeth | 224/493 |
| 3,215,323 A | 11/1965 | Bonitt | |
| 3,260,929 A * | 7/1966 | Hedgepeth | 224/492 |
| 3,330,454 A | 7/1967 | Bott | |

(Continued)

OTHER PUBLICATIONS

Advertisement: Yakima Spare Tire Carrier, Cargo Basket for Roof Racks, available at http://www.rackoutfitters.com/catalog/yakima_spare_tire_carrier_1836640.htm., dated Jul. 7, 2003, 1 page.

(Continued)

*Primary Examiner* — Nathan J Newhouse
*Assistant Examiner* — Todd Anderson
(74) *Attorney, Agent, or Firm* — Sheridan Ross P.C.

(57) ABSTRACT

A convertible roof rack is provided that is generally comprised of a light bar and a roof rack that is spaced from the roof of a vehicle. The roof rack is also rotatably interconnected to a support structure associated with the rear of the vehicle such that it is capable of moving from a first position of use adjacent to the roof to a second position of use away from the roof where the light bar remains interconnected to the vehicle adjacent to the windshield. As such, electrical connections associated with the light bar remain intact when the roof rack is rotated away from the roof.

11 Claims, 19 Drawing Sheets

U.S. PATENT DOCUMENTS

| | | | | |
|---|---|---|---|---|
| 3,531,006 | A * | 9/1970 | Farchmin | 414/462 |
| 3,765,713 | A | 10/1973 | Suitt | |
| 3,902,642 | A * | 9/1975 | McNeece | 224/526 |
| 4,336,897 | A * | 6/1982 | Luck | 224/497 |
| 4,350,471 | A | 9/1982 | Lehmann | |
| 4,817,834 | A * | 4/1989 | Weiler | 224/509 |
| 4,948,024 | A | 8/1990 | Warner et al. | |
| 5,171,083 | A * | 12/1992 | Rich | 362/493 |
| 5,381,939 | A * | 1/1995 | Tippets | 224/526 |
| D359,134 | S | 6/1995 | Toews | |
| 5,560,525 | A * | 10/1996 | Grohmann et al. | 224/310 |
| D406,557 | S | 3/1999 | Bentley | |
| D413,562 | S | 9/1999 | Van Dusen et al. | |
| 6,003,633 | A | 12/1999 | Rolson | |
| 6,015,074 | A | 1/2000 | Snavely et al. | |
| D422,553 | S | 4/2000 | VonDuyke | |
| 6,116,378 | A | 9/2000 | Barrow | |
| D434,364 | S | 11/2000 | Bauer et al. | |
| 6,152,339 | A * | 11/2000 | Kreisler | 224/319 |
| D434,718 | S | 12/2000 | Kreisler | |
| D435,510 | S | 12/2000 | Quidort | |
| 6,179,180 | B1 | 1/2001 | Walker | |
| D442,289 | S | 5/2001 | Ziaylek et al. | |
| 6,425,508 | B1 | 7/2002 | Cole et al. | |
| D470,451 | S | 2/2003 | Bushart et al. | |
| 6,561,397 | B1 | 5/2003 | Bauer et al. | |
| 6,581,813 | B2 | 6/2003 | Bove et al. | |
| D477,562 | S | 7/2003 | McCoy et al. | |
| 6,604,606 | B1 * | 8/2003 | McDougal et al. | 182/127 |
| D479,884 | S | 9/2003 | Berryman | |
| D481,003 | S | 10/2003 | Bauer et al. | |
| D490,163 | S | 5/2004 | Thurston | |
| 6,739,349 | B2 | 5/2004 | Kastenschmidt et al. | |
| 6,755,332 | B2 * | 6/2004 | Crane et al. | 224/321 |
| D508,015 | S | 8/2005 | Badillo | |
| D512,783 | S | 12/2005 | Badillo | |
| D520,938 | S | 5/2006 | Badillo | |
| 7,055,454 | B1 * | 6/2006 | Whiting et al. | 114/364 |
| D537,404 | S | 2/2007 | Bauer et al. | |
| 7,226,266 | B2 * | 6/2007 | Henderson et al. | 414/462 |
| 7,249,927 | B2 * | 7/2007 | Wooten et al. | 414/466 |
| D549,838 | S | 8/2007 | Badillo | |
| D558,123 | S | 12/2007 | Murillo | |
| D578,952 | S | 10/2008 | Badillo | |
| 2004/0131456 | A1 * | 7/2004 | Henderson et al. | 414/462 |
| 2005/0082326 | A1 * | 4/2005 | Badillo | 224/326 |
| 2005/0092796 | A1 * | 5/2005 | Essig | 224/321 |
| 2005/0095102 | A1 * | 5/2005 | Watson | 414/462 |
| 2011/0101056 | A1 * | 5/2011 | Barkey | 224/321 |

OTHER PUBLICATIONS

Advertisement: Thule 840-Playpen Basket, Cargo Basket for Roof Racks, availble at http://www.rackoutfitters.com/catalog/thule_840_-_playpen_basket_1885452.htm, dated Jul. 7, 2003, 1 page.

Advertisement: SURCO, Products, Inc., "Basket rack-it just flat out carries what you need to take," available at http://www.everythingsuv.com/surco_safari_roof_racks-esuv.asp, dated Jul. 7, 2003, 10 pages.

Advertisement: KargoMaster, Kargo Master Safari Racks, available at http://www.kargomaster.com/jeep23.asp?rack=sport_jeep, Jul. 7, 2007, 1 page.

Advertisement: KargoMaster, The Bushman Steel Rack, available at http://www.kargomaster.com/bushman.asp?type=Jeep, dated Jul. 7, 2003, 1 page.

Advertisement: KargoMaster, Seregenti Telescoping Steel Rack, available at http://www.kargomaster.com/seregenti.asp?type=Jeep, dated Jul. 7, 2003, 1 page.

Advertisement: Bauer Vehicle Gear Roof Racks, Roof Storage, Bike Storage & Pet Barriers from Eve, available at http://www.everythingsuv.com/bvg_products-esuv.asp, Jul. 7, 2003, 2 pages.

Advertisement: Manik Original Off-Road Equipment, Hummer Rough Terrain Package New Product Release "Tilt-Forward 1-Piece Front Bar," 2002, 1 page.

Advertisement: Manik Original Off-Road Equipment, Hummer Rough Terrain Package New Product Release "Combination Tube Step Rocker Bar," 2002, 1 page.

Advertisement: Congo Cage Jeep Rack, available at http://www.kargomaster.com/item.asp?id=62, printed Apr. 17, 2009, 13 pages.

Product Literature entitled, "921-Dave's Rack 921-12X," Olympic 4X4, date unknown, 10 pages.

Advertisement: 921—Daves Rack, Olympic 4X4 Products for over 60 years, available at http://olympic4X4products.com/utility-racks/921-daves-rack, printed Jan. 14, 2011, 3 pages.

* cited by examiner

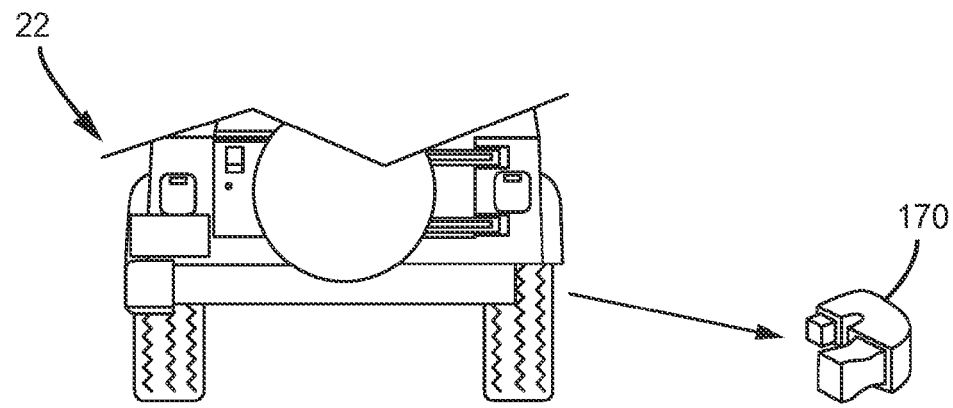
FIG. 24
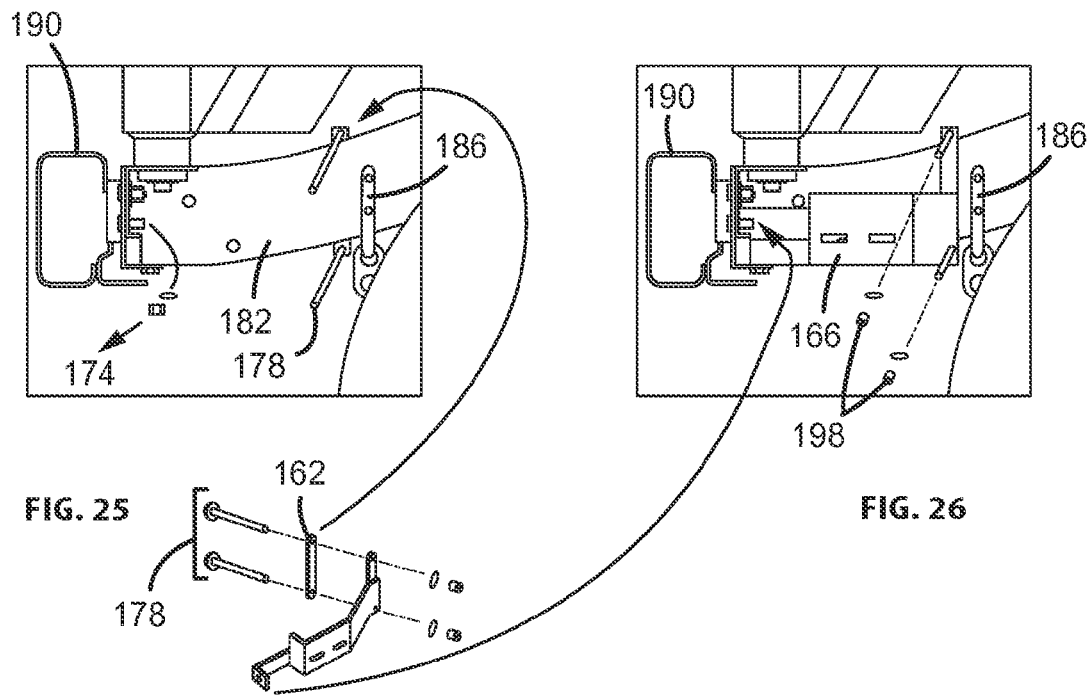
FIG. 25
FIG. 26

CONVERTIBLE VEHICLE STORAGE RACK

CROSS REFERENCE TO RELATED APPLICATIONS

This patent application claims the benefit of U.S. Ser. No. 61/237,177, filed Aug. 26, 2009, entitled "Convertible Vehicle Storage Rack", which is incorporated by reference in its entirety herein. This application is also related to U.S. Patent Application Publication No. 2005/0082326, filed Sep. 24, 2004, entitled "Multi-Purpose Storage Rack for a Sport Utility Vehicle", U.S. Pat. No. D578,952, filed Feb. 20, 2008, entitled "Sport Utility Vehicle Rack", U.S. Pat. No. D512,783, filed Jun. 4, 2003, entitled "Vehicle Ladder", and U.S. Pat. No. D508,015, filed Mar. 17, 2003, entitled "Multi-purpose Storage Rack for a Sport Utility Vehicle", the entire disclosures of which are incorporated by reference herein.

FIELD OF THE INVENTION

Embodiments of the present invention are generally related to storage racks for interconnection to a motor vehicle. More specifically, one embodiment of the present invention is a vehicle storage rack with lighting elements associated with a fixed portion that also includes a selectively movable portion that is capable of moving from a first position of use to a second position of use without having to disconnect associated wiring.

BACKGROUND OF THE INVENTION

Storage racks are often installed on vehicles to permit carrying additional items that will not fit within the vehicle or are not desirable to carry in the vehicle. Storage racks also often accommodate a variety of lights, such as fog lights. It is sometimes necessary to remove the storage rack to make modifications to the vehicle. For example, the storage rack of some vehicles must be removed in order to gain access to various roof elements for removal or replacement. That is, in order to facilitate changing the exterior of a vehicle, the roof rack must be removed. This is often a cumbersome and difficult task wherein the aforementioned lights and associated wiring must be removed. To complicate this task, roof racks are often heavy, and may be difficult and/or dangerous to remove and replace by a lone individual. To complicate this task, roof racks are often heavy, and may be difficult and/or dangerous to remove and replace by a lone individual.

Another drawback of the roof racks of the prior art is that they are often hard-mounted to the vehicle, which requires the drilling of additional holes into the vehicle. If drilled by the end user, these holes are often located incorrectly, thereby requiring re-drilling, and possibly, decreasing the resale value of the vehicle. Thus it would be desirable to provide a storage rack that is easily interconnected to a vehicle without requiring permanent modifications to the vehicle.

Thus it is a long felt need to provide a roof storage rack that is easily installed on a vehicle and that is easy to remove, completely or partially, from the vehicle so that the vehicle may be accessed or modified. It is also desirable to provide a storage rack that allows for lights and other electrical components associated with the vehicle storage rack to remain interconnected to the power source of the vehicle. The following disclosure describes an improved vehicle storage rack that allows front mounted lights to be maintained with the rack when another portion of the rack is moved to provide access to various areas of the vehicle.

SUMMARY OF THE INVENTION

It is one aspect of embodiments of the present invention to provide a roof storage rack ("roof rack") for installation on a vehicle. The roof rack of one embodiment of the present invention includes a light bar for accommodating at least one light that is interconnected to the vehicle adjacent to the windshield and selectively interconnected to the roof rack. The roof rack of this embodiment of the present invention is also interconnected to a support bar that is rotatably interconnected to members that are associated with a rear portion of the vehicle. One advantage of embodiments of the present invention is that the roof rack is installed by using existing holes and/or standard hardware of the vehicle so that no modifications need to be made to the vehicle.

It is another aspect of one embodiment of the present invention to provide a roof rack that includes a light bar that remains interconnected to the vehicle when the roof rack is moved therefrom. More specifically, one embodiment of the present invention employs a light bar that is firmly associated with a windshield frame of a vehicle. As one skilled in the art will appreciate, often the lights associated with a light bar, such as fog lights, include a plurality of wires that are interconnected to the power source of the vehicle. These wires are often fed through the tubular structure of the light bar and interconnected to the battery of the vehicle. In one embodiment of the present invention, the light bar remains fixed to the vehicle roof and/or windshield frame such that removal of the remainder of the roof rack from the roof does not require disconnection of the lights.

It is another aspect of one embodiment of the present invention to provide a roof rack that is relatively easy to install. More specifically, one advantage of embodiments of the present invention is that no additional holes need to be drilled into the vehicle for installation. That is, embodiments of the present invention utilize holes and/or fasteners of the vehicle frame and/or body. Further, one embodiment of the present invention uses both the vehicle frame and body to provide a stable roof rack that helps prevent roof rack sway. A plurality of wear plates may be glued or otherwise interconnected to the vehicle to prevent vehicle marring or wear from portions of the roof rack that are positioned adjacent to the vehicle body. As such, the roof rack may be easily installed and removed without damaging the vehicle, which improves the potential resale value thereof.

It is another aspect of one embodiment of the present invention to provide a roof rack that may be installed and operated by a single individual. More specifically, the roof rack may be disassembled into easy to handle pieces that facilitate integration onto the vehicle. In operation, the roof rack is designed to rotate away from the roof and the light bar and then be supported by a lanyard, rope, tether or bungee that interconnects the roof rack to the light bar. Roof racks of embodiments of the present invention are thus able to achieve the contemplated rotation under the force and guidance of one individual, which will be described in further detail below.

It is yet another aspect of the present invention to provide a roof rack that is adapted to receive other items, such as a ladder, a sun roof insert, and other equipment, as described in some of the above-identified references.

It is another aspect of the present invention to provide a convertible roof rack adapted for use with a vehicle comprising: a light bar adapted to interconnect to a vehicle adjacent a windshield thereof; a first support tower and a second support tower, each interconnected to the frame of the vehicle adjacent to the rear thereof; a support bar having a first leg operably interconnected to the first support tower and a second leg operably interconnected to the second support tower; a roof rack interconnected on one end to the support bar between the first leg and the second leg, the roof rack being selectively interconnected on another end to the light bar; and wherein the roof rack is capable of movement from a first position of use adjacent to the roof of the vehicle to a second position of use away from the roof of the vehicle while the light bar remains interconnected to the vehicle.

It is still yet another aspect of the present invention to provide a convertible roof rack adapted for use with a vehicle comprising: a light bar adapted to interconnect to a vehicle adjacent to a windshield thereof; a means for supporting interconnected to the vehicle; a roof rack rotatably interconnected on one end to the means for supporting, the roof rack being selectively interconnected on another end to the light bar; wherein the roof rack is capable of movement from a first position of use adjacent to the roof of the vehicle to a second position of use away from the roof of the vehicle while the means for supporting remains associated with the vehicle; and wherein the light bar remains fixed to the vehicle regardless of the position of the roof rack.

It is yet another aspect of the present invention to provide a method of using a convertible roof rack adapted for use with a vehicle comprising; interconnecting a light bar to a vehicle adjacent to a windshield thereof using existing vehicle hardware; interconnecting a first support member and a second support member to the frame of the vehicle; interconnecting the support bar to the first support member and the second support member; interconnecting the roof rack to a support bar; moving the roof rack to a first position of use by rotating the support bar towards a roof of the vehicle; interconnecting the roof rack to the light bar; and moving the roof rack to a second position of use by rotating the support bar away from the roof of the vehicle while maintaining the position of the light bar.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 24 is a rear elevation view of a vehicle for receiving one embodiment of the present invention shown with a rear bumper end cap removed;

FIG. 25 is a detailed view of FIG. 24 showing the interconnection of the clamp plate to the vehicle's frame;

FIG. 26 is a detailed view of FIG. 24 showing the interconnection of a frame extension plate;

FIG. 27 is a partial perspective view of the frame extension plate interconnected to a vehicle;

Figure 1:
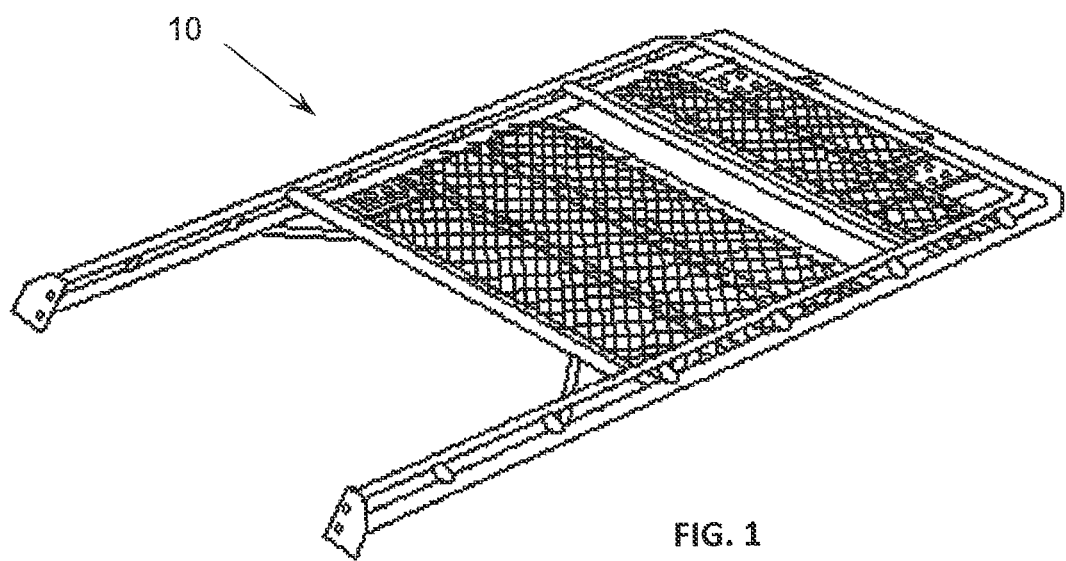
FIG. 1 is a perspective view of a roof rack of one embodiment of the present invention.
Figure 2:
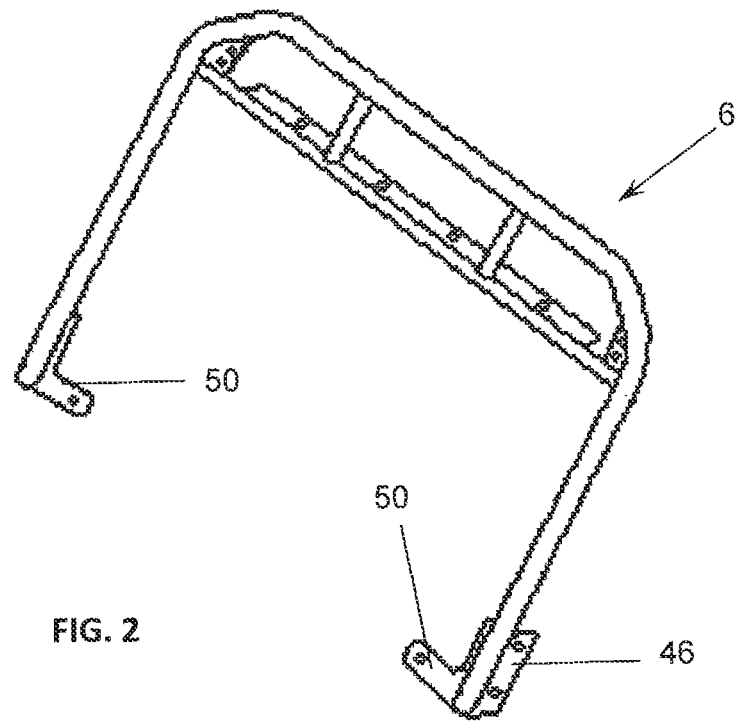
FIG. 2 is a perspective view of a light bar of one embodiment of the present invention.

To assist in the understanding of one embodiment of the present invention the following list of components and associated numbering found in the drawings is provided herein:

| # | Component |
|---|---|
| 2 | Roof rack system |
| 6 | Light bar |
| 10 | Roof rack |
| 14 | Support bar |
| 18 | Support tower |
| 22 | Vehicle |
| 26 | Roof |
| 30 | Windshield |
| 34 | Windshield frame |
| 38 | Light |
| 42 | Screw |
| 46 | Outer bracket |
| 50 | Inner bracket |
| 54 | Inner body |
| 58 | Outer body |
| 62 | Lip |
| 66 | Clamp portion |
| 70 | Pinch plate |
| 74 | Screw |
| 78 | Isolator |
| 82 | Wear plate |
| 86 | Support plate |
| 90 | Stud |
| 94 | Frame |
| 98 | Collar |
| 102 | Bolt |
| 106 | Washer |
| 110 | Shoulder washer |
| 114 | Flange |
| 118 | Bracket |
| 122 | Bolt |
| 126 | Isolator |
| 130 | Washer |
| 134 | Jam nut |
| 138 | Bolts |
| 142 | Nut |
| 146 | Light bar plate |
| 150 | Roof rack plate |
| 154 | Ladder |
| 158 | Bracket |
| 162 | Clamp plate |
| 166 | Frame extension plate |
| 170 | Rear bumper end cap |
| 174 | Lower nut and washer |
| 178 | Carriage bolts |
| 182 | Rear frame |
| 186 | Tail pipe support |
| 190 | Rear bumper |
| 194 | Bumper bolt |
| 198 | Tail pipe |
| 202 | Inner body flange |
| 206 | Inner body sheet metal wall |
| 210 | Sunroof Insert |
| 212 | Lower edge portion |
| 214 | Ear |
| 218 | Lower roof rack tube |
| 222 | Clamp |
| 226 | Bolt |
| 230 | Knob |
| 234 | Upper roof rack tube |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-19, a convertible roof rack system 2 of one embodiment of the present invention is shown. More specifically, the convertible roof rack system 2 is comprised of a light bar 6, a roof rack 10, a support bar 14, and support towers 18 that are all operably interconnected to a vehicle 22. The roof rack 10 is placed above the roof 26 of the vehicle 22 and adjacent to a rear end and windshield 30 thereof. The support bars 14 are rotatably interconnected to the support towers 18 and are thus able to move from a first position of use adjacent to the roof 26 to a second position of use away from the vehicle 22. A front end of the roof rack 10 is selectively interconnected to the light bar 6, which is firmly interconnected on the windshield frame 34 adjacent to the windshield 30 of the vehicle 22. Thus, the roof rack 10 may be rotated away from the roof 26 of the vehicle 22 while the light bar 6 remains in place.

Figure 7:
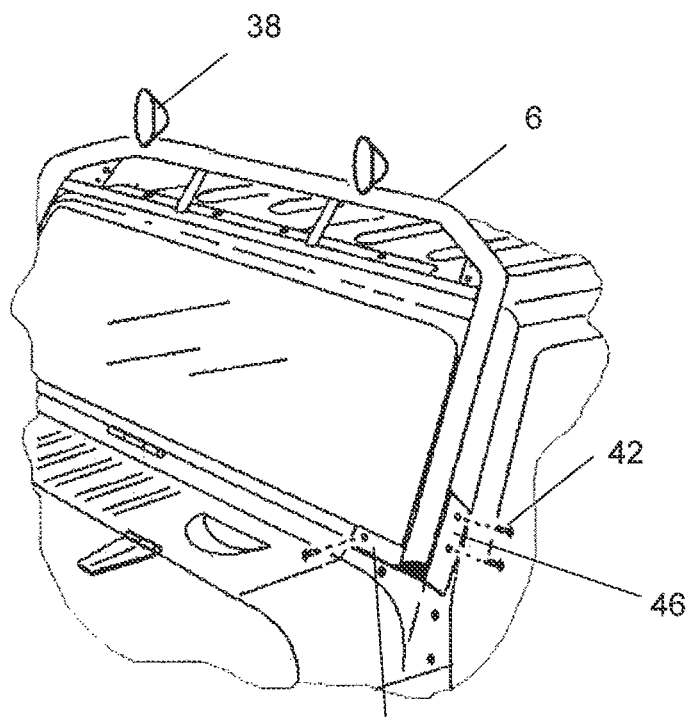
FIG. 7 is a perspective view of the vehicle shown in FIG. 6 with interconnected light bar.
Figure 8:
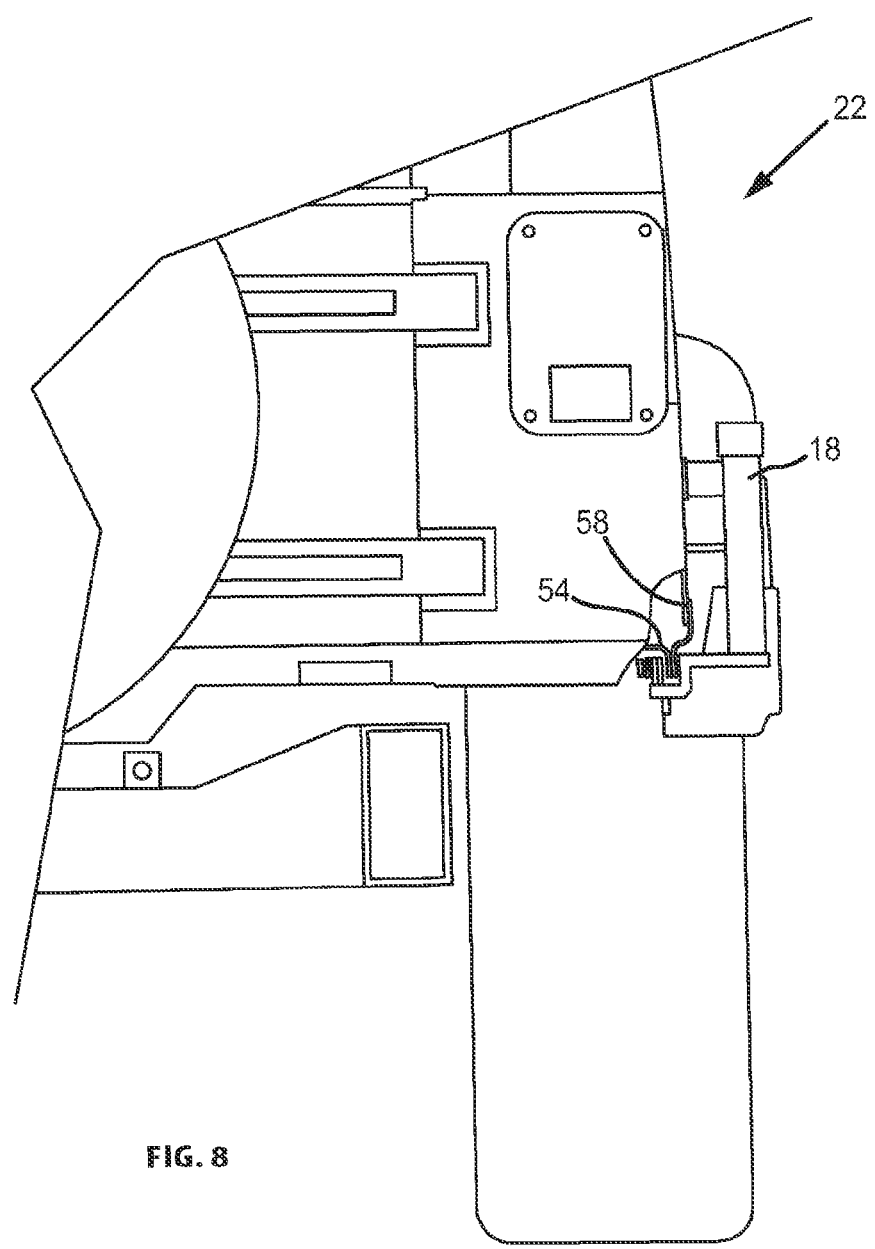
FIG. 8 is a rear elevation view of a vehicle of one embodiment of the present invention shown with interconnected support tower.
Figure 9:
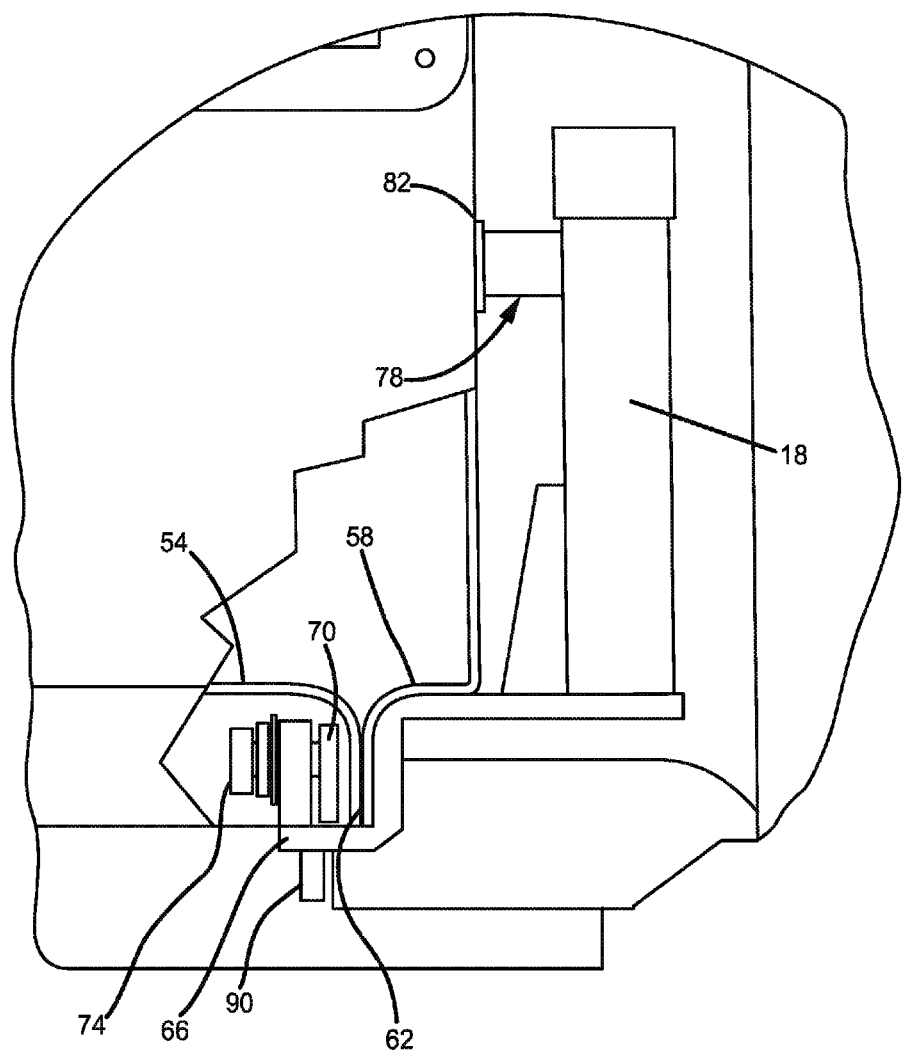
FIG. 9 is a detailed view of FIG. 8 showing the interconnection of the support tower.
Figure 10:
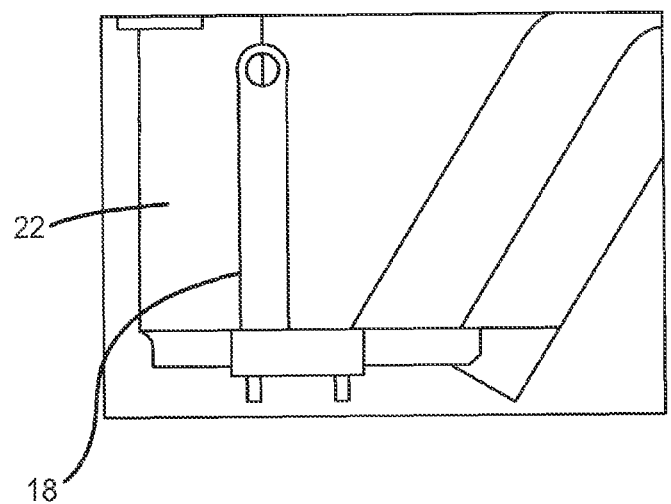
FIG. 10 is a side elevation view of FIG. 9.

Referring now to FIGS. 2, 6, 7, and 20-23 the light bar 6 of one embodiment of the present invention is shown. In FIG. 7, lights 38 are shown interconnected to the light bar 6 in the remaining other views of the application, the lights are omitted for clarity. One skilled in the art will appreciate that any number of lights 38 or other electronic componentry, such as speakers, neon lights, signs, etc., may be associated with the light bar 6 in any fashion without departing from the scope of the invention. The light bar 6 is adapted to be interconnected to lights 38 of various sizes and shapes. For example, in FIG. 22, lights 38 are rectangular and in FIG. 23, lights 38 are circular.

The light bar 6 is preferably a tubular structure that is interconnected to the windshield frame 34 that is adjacent to the windshield 30 of the vehicle 22. Some vehicles 22 include a plurality of screws 42 for roof racks that are associated with the windshield frame 34 and are located adjacent to the windshield 30. In operation, these screws 42 are removed and replaced or reused to interconnect an outer bracket 46 and an inner bracket 50 of the light bar 6 to the windshield frame 34. Thereafter, the wires associated with electronic components associated with the light bar 6 are then interconnected to the power source of the vehicle 22. In one embodiment, an electrical connector is in association with the light bar and the electrical connector is in electrical communication with the power source of the vehicle 22.

Referring now to FIGS. 4 and 8-11, the interconnection of the support towers 18 to the vehicle is shown. Vehicles 22 in which embodiments of the present invention are preferably interconnected include an inner body 54 and an outer body 58 that are interconnected to form a downwardly extending lip 62. The support tower 18 of embodiments of the present invention includes a clamp portion 66 that includes a pinch plate 70 and is associated with a screw 74. In operation, tightening of the screw 74 sandwiches the lip 62 between the clamp portion 66 of the support tower 18 and the pinch plate 70 to hold the support tower 18 in place. It should be understood, however, that in some instances drilling of holes may be required to interconnect the support tower or other components described herein. The support tower 18 may also include a load isolating member, i.e. an isolator 78, which is interconnected between the support tower 18 and a wear plate 82 that is adhered to the vehicle 22. In operation, vibrational loads associated with a support tower 18 are transferred through the isolator 78 to the wear plate 82, thereby protecting the vehicle 22 from any loads or abrasions. Preferably, the isolator 78 of one embodiment is made of nylon. One of skill in the art will appreciate that the support tower may be omitted wherein the support bar is selectively interconnected to a base plate 84 that is associated with the clamp portion 66.

Figure 5:
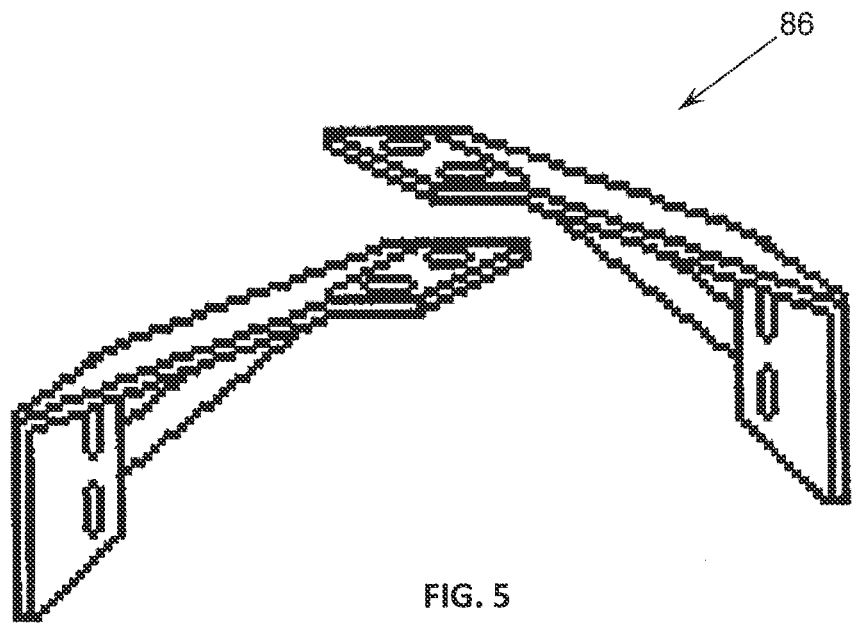
FIG. 5 is a perspective view of support plates of one embodiment of the present invention.
Figure 6:
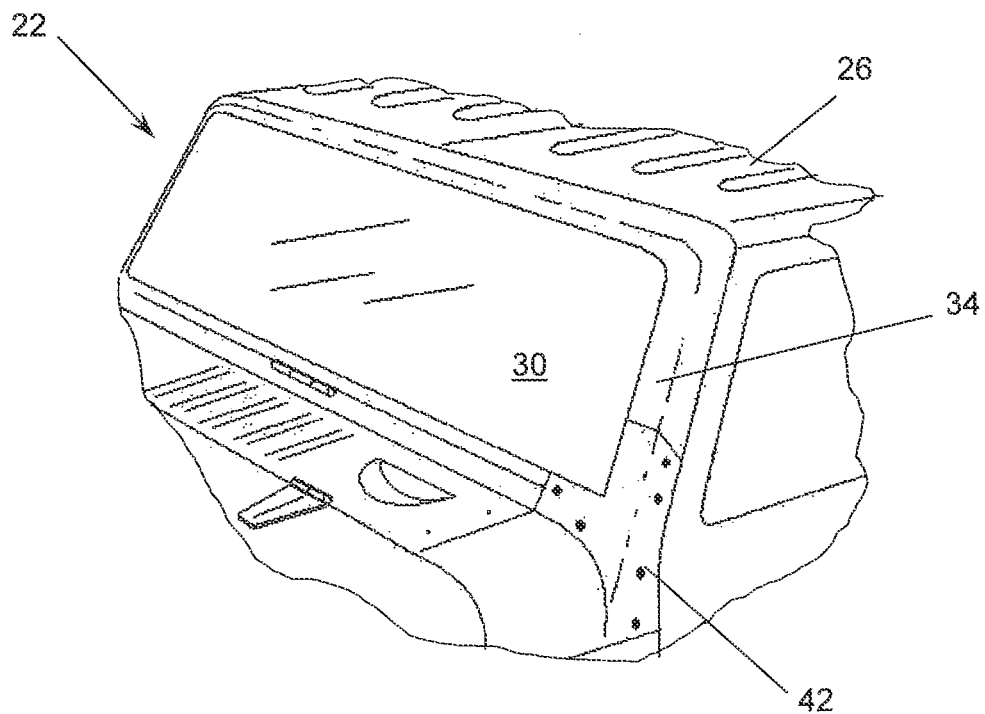
FIG. 6 is a partial perspective view of a vehicle of one embodiment of the present invention.
Figure 11:
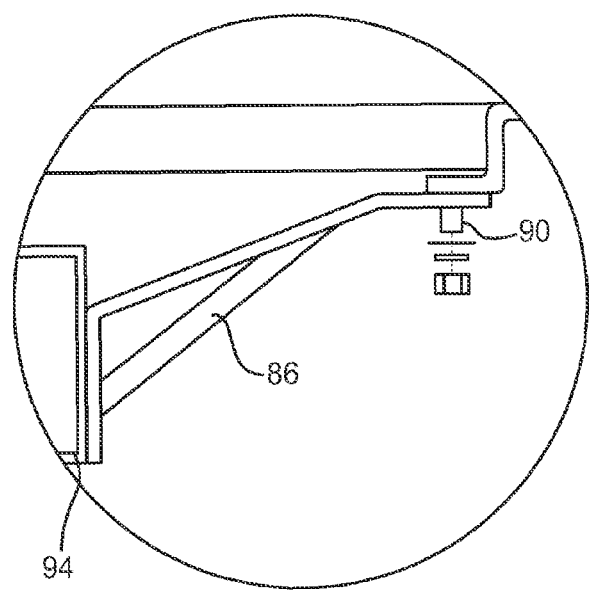
FIG. 11 is a detailed view similar to that of FIG. 9 wherein a support plate is additionally interconnected to the support tower.

Referring now to FIGS. 5 and 11, in order to further strengthen the interconnection between the support tower 18 and the vehicle 22, a support plate 86 may be utilized. The support plate 86 interconnects to a stud 90 of the support tower 18 on one end and to a frame 94 of the vehicle 22 on the other end. It is contemplated that the interconnection with the frame 94 is achieved by utilizing holes and fasteners normally used to interconnect the bumper (not shown) to the vehicle 22. That is, the bumpers of many vehicles are interconnected to the frame by a plurality of bolts and it is contemplated that those bolts be removed to interconnect the support plates 86 to the frame 94. Thereafter, a bracket (not shown) would be utilized that would share those bolts and provide a location for the re-interconnection of the bumper to the frame 94. The support plate 86 thus allows bending loads that would force the support tower away from the vehicle to be transferred directly to the frame 94. One of skill in the art will appreciate that the towers 18 may be omitted where the support bars 14 are alternatively interconnected to the support plates 86.

Figure 3:
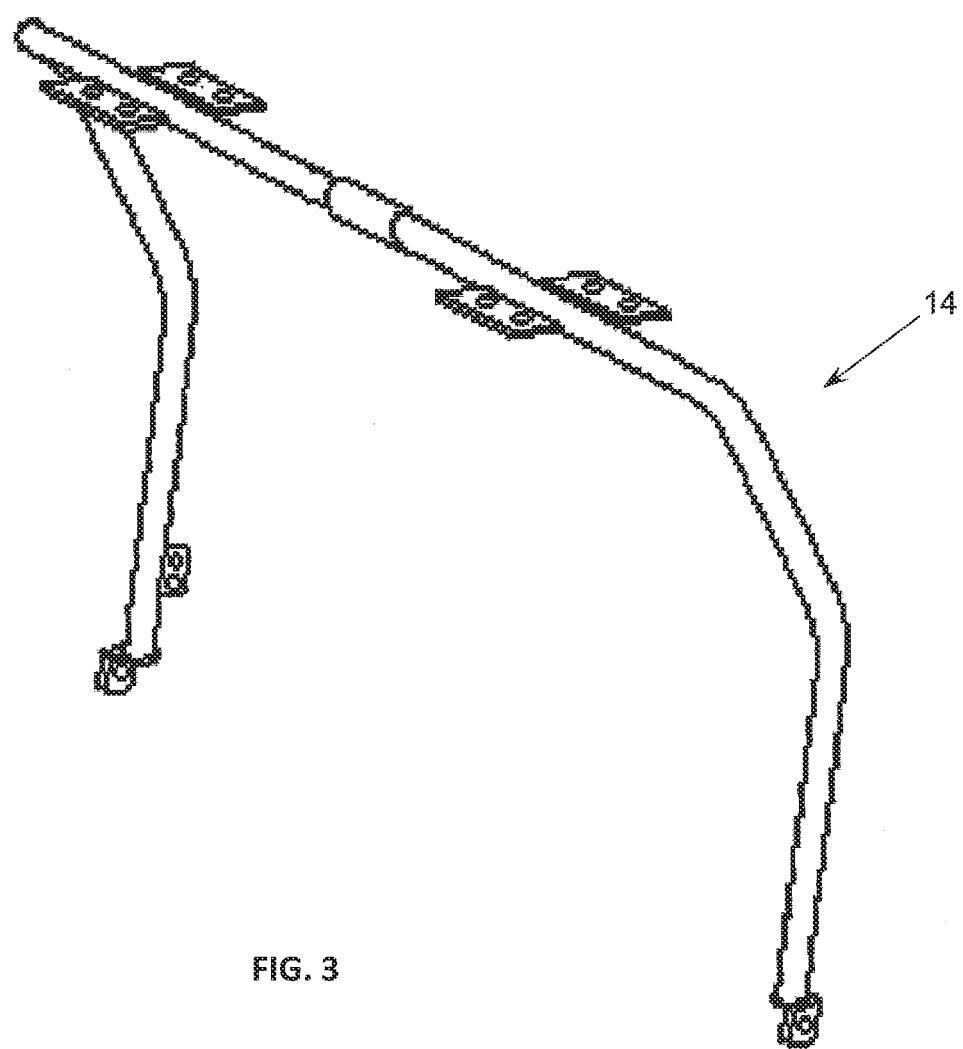
FIG. 3 is a perspective view of a support bar of one embodiment of the present invention.
Figure 4:
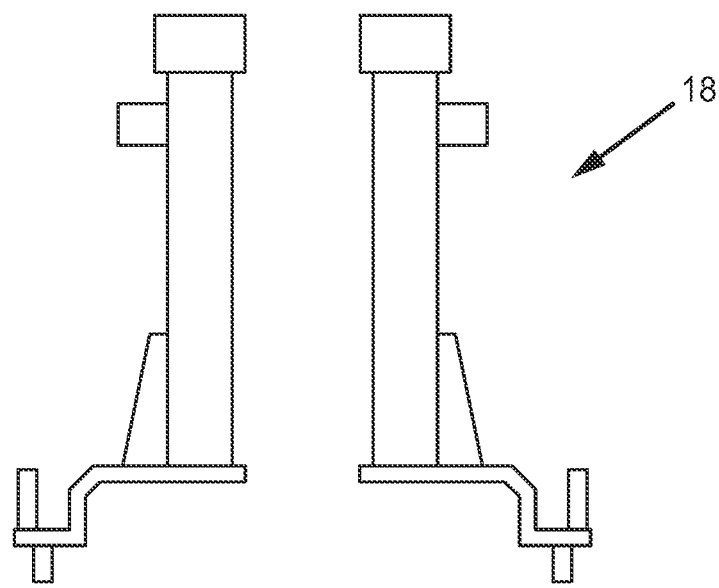
FIG. 4 is a front elevation view of support towers of one embodiment of the present invention.
Figure 12:
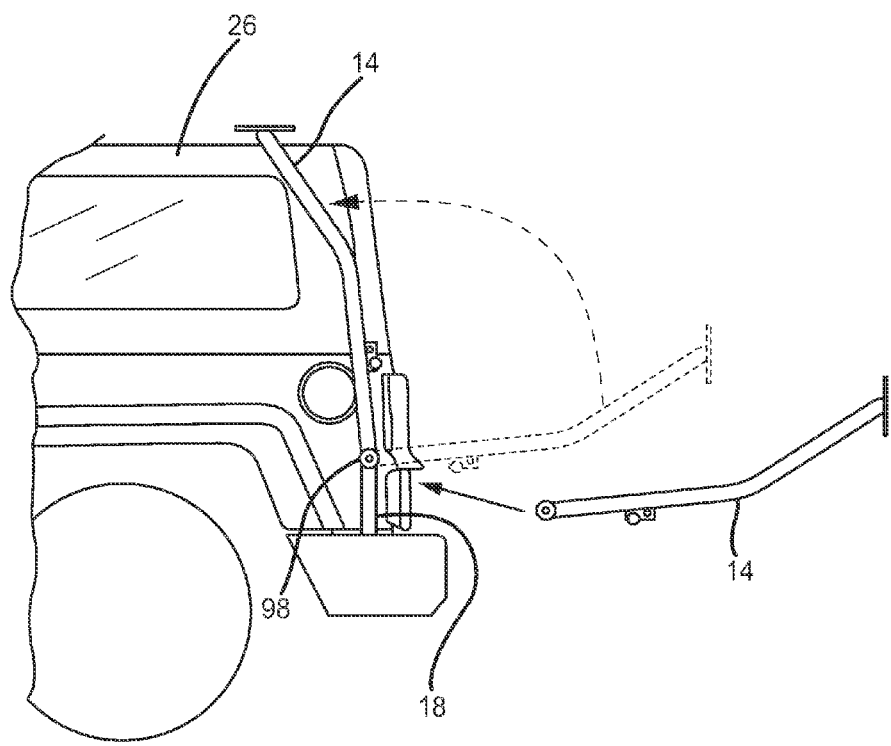
FIG. 12 is a side elevation view of the vehicle and support bar shown in two positions of use.
Figure 13:
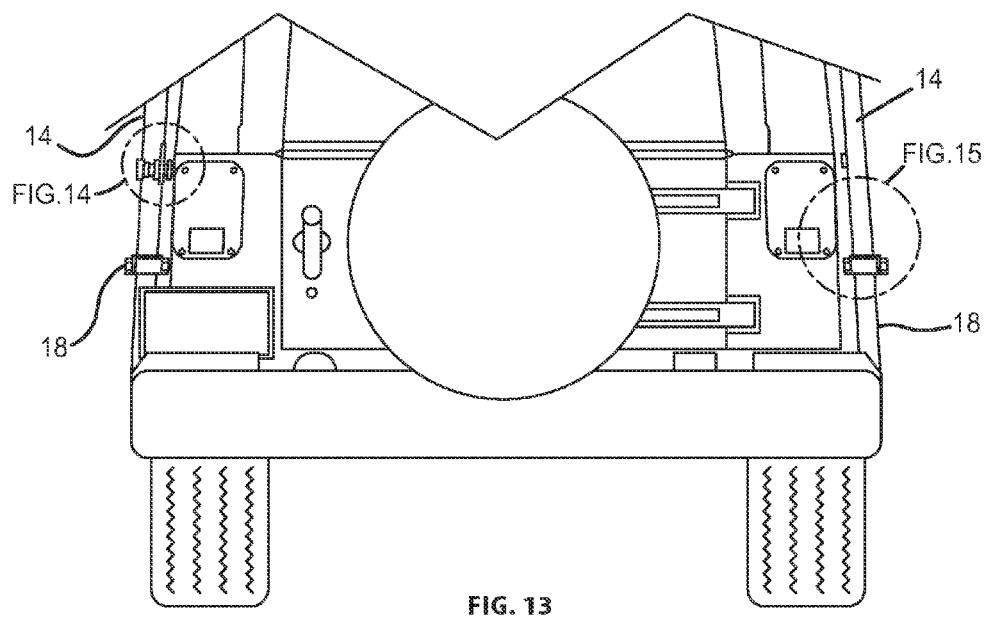
FIG. 13 is a rear elevation view of the vehicle showing the interconnected support bar.
Figure 15:
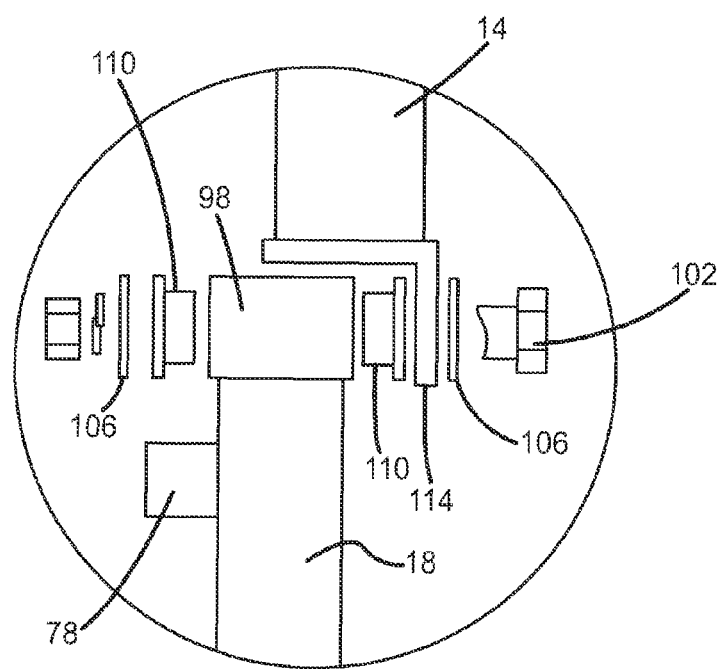
FIG. 15 is a detailed view of FIG. 13.

Referring now to FIGS. 3, 12 and 15, the support bar 14 is shown that supports the rear of the vehicle rack 10 and is rotatably interconnected to the support tower 18. Preferably, the support tower 18 includes a collar 98 that receives a portion of the support bar 14 and is held in place by a bolt 102 that is associated with a washer 106 with a plurality of shoulder washers 110 therebetween. One skilled in the art will appreciate that other interconnection methods, such as a clevis, may be employed without departing from the scope of the invention. The bolt 102 interconnects a flange 114 of the support bar 14 with the bolt 102 resting within the collar 98 of the support flange 114. Thus, the support bar 14 is capable of moving from a first position of use adjacent to the roof 26 of the vehicle 22 to a second position of use away therefrom.

Figure 14:
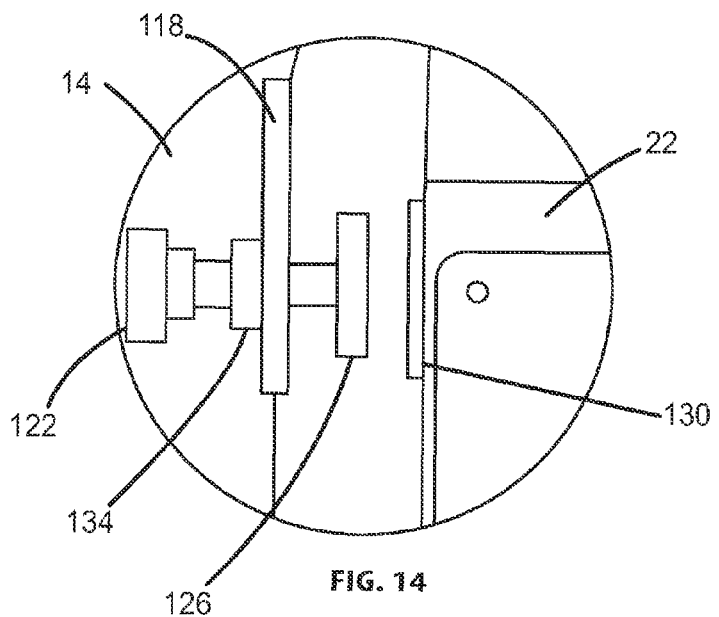
FIG. 14 is a detailed view of FIG. 13.

Referring to FIG. 14, in order to further reduce sway of the roof rack, the support bar 14 may also include a bracket 118 that receives a bolt 122 with an interconnected isolator 126. In one embodiment of the present invention, the isolator 126 is made of rubber and interacts with a washer 130 or wear plate that is interconnected to the vehicle 22 with adhesive. A jam nut 134 may also be used to ensure that the isolator 126 remains firmly associated with the washer 130. The isolator 126 may be interconnected anywhere along the length of the support bar 14 so long contact is made with the vehicle or associated wear plate.

Figure 16:
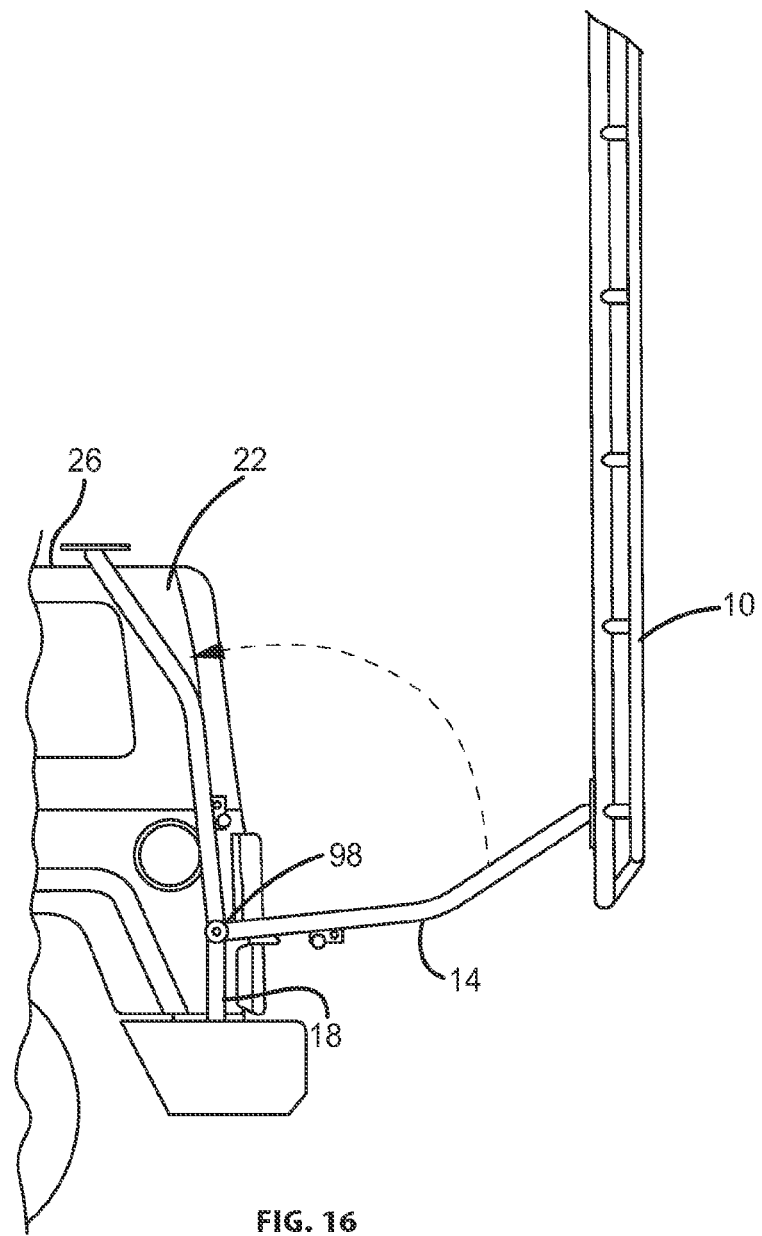
FIG. 16 is a side elevation view of a vehicle with interconnected support bar and vehicle rack.
Figure 17:
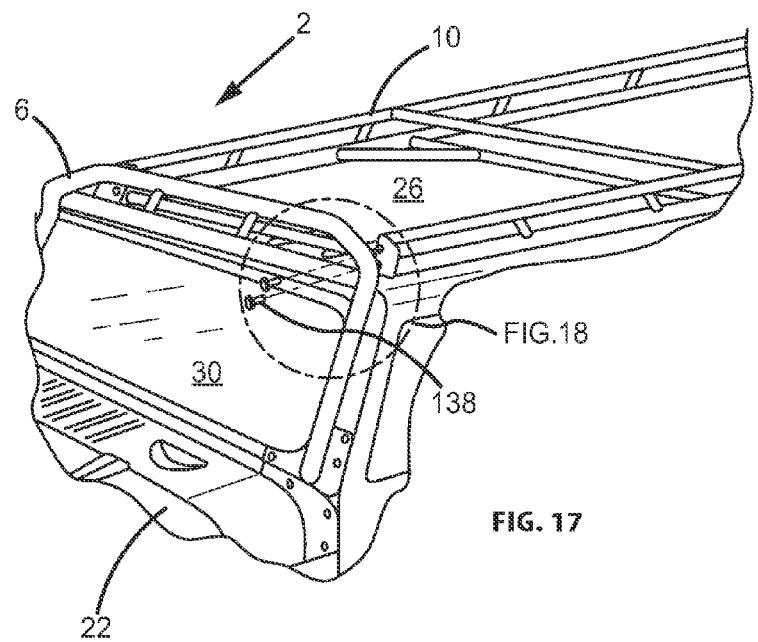
FIG. 17 is a partial perspective view of the vehicle rack interconnected to the light bar.
Figure 18:
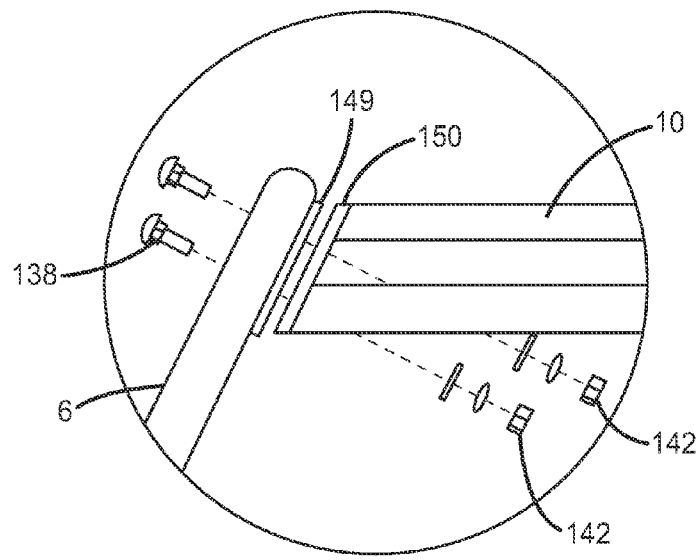
FIG. 18 is a front detail view of FIG. 17.

Referring now to FIG. 16-18, the operation of one embodiment of the present invention is shown. In operation, the roof rack 10 is interconnected to the support bar 14, which is rotatably interconnected to the support towers 18. In order to move the roof rack 10 to the first position of use adjacent to the roof 26, one would push the support bar 18 and rotate the roof rack 10 towards the roof 26 of the vehicle 22. It is important to note that the roof rack 10 in the second position of use may be supported by a piece of wood or other items associated with the ground. More preferably, however, a lanyard (not shown) is interconnected to the light bar 6 on one end and to the roof rack 10 on the other end, to prevent over rotation of the roof rack 10 past its second position of use. After the roof rack 10 is placed in the first position of use, as succinctly shown in FIG. 17, the bolts of FIG. 14 are tightened to place the isolators in contact with the washers, thereby substantially reducing sway of the roof rack 10.

Finally, the roof rack is interconnected to the light bar 6 as shown in FIGS. 17 and 18 by way of a plurality of bolts 138 and nuts 142 that are used to interconnect a light bar plate 146 to a roof rack plate 150. One skilled in the art will appreciate that an additional lanyard or safety mechanism may be interconnected such that if the bolts 138 were to become loose, the roof rack 10 would remain interconnected to the light bar 6. Although a traditional nut 142 and bolt 138 configuration is shown in FIG. 18, one skilled in the art will appreciate that a bolt 138 with a larger head that facilitates hand tightening may be used such as shown in FIG. 14 may be used to facilitate use of the convertible roof rack without tools.

Figure 19:
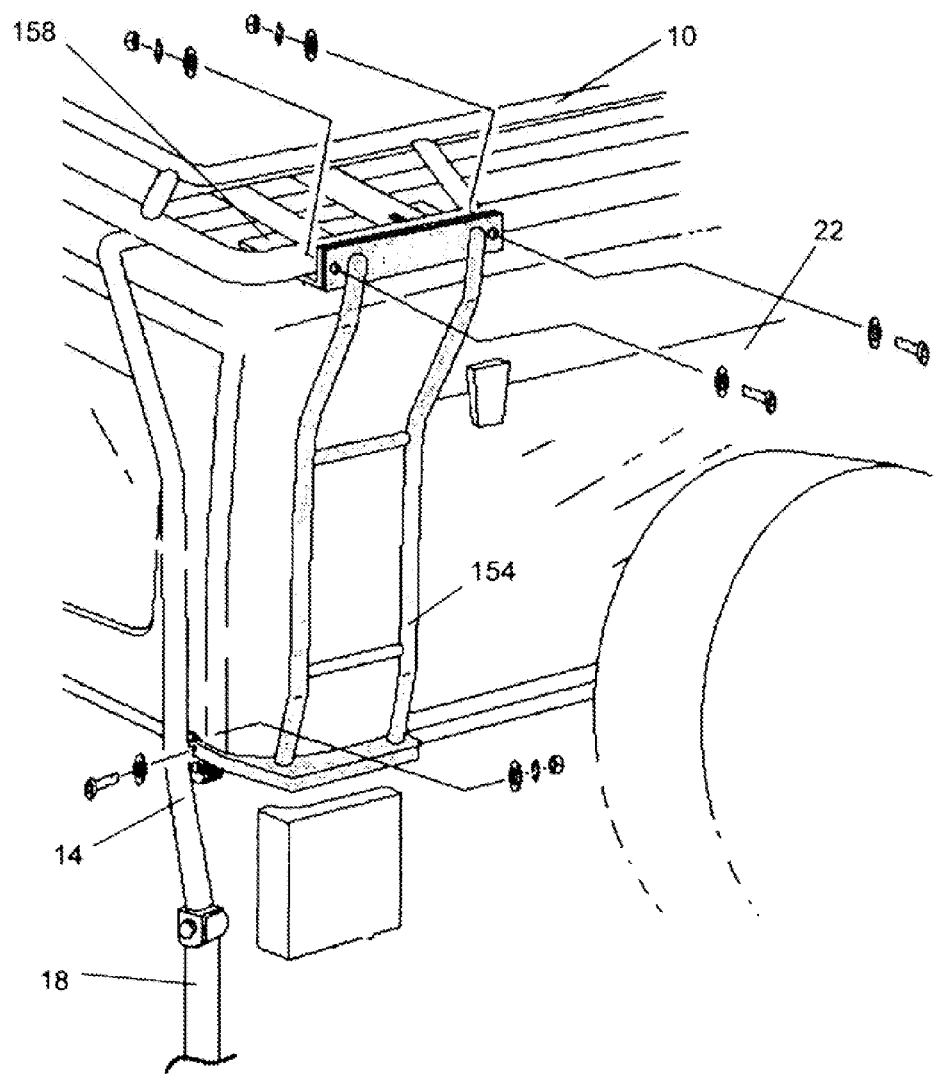
FIG. 19 is a rear perspective view of the roof rack system of one embodiment of the invention with an optional ladder interconnected thereto.
Figure 20:
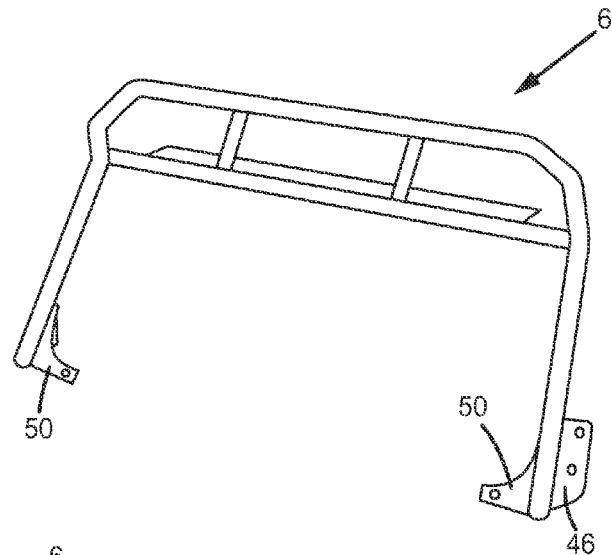
FIG. 20 is a perspective view of a light bar of another embodiment of the present invention.
Figure 21:
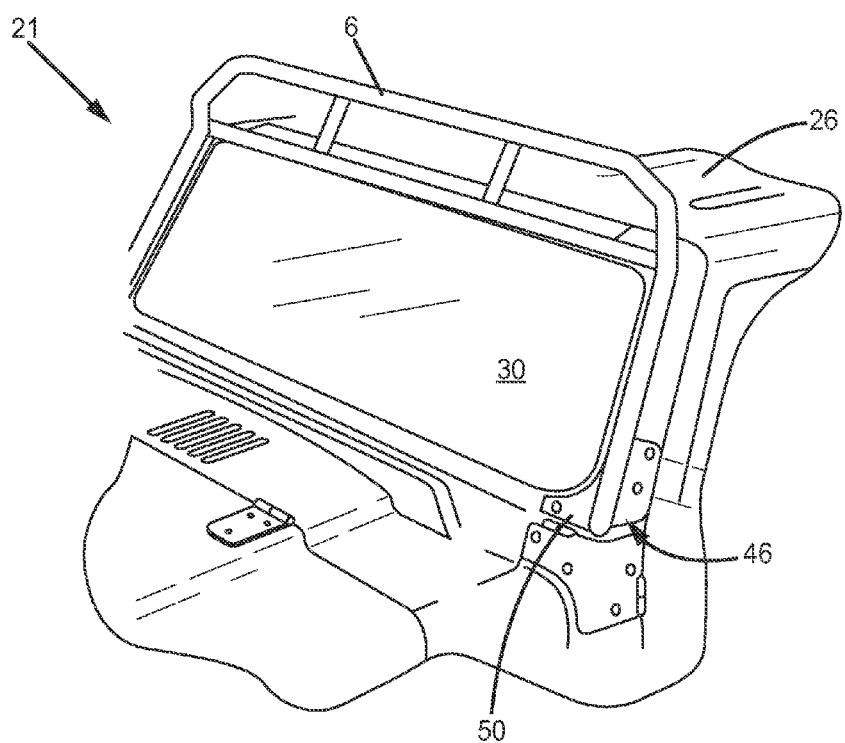
FIG. 21 is a partial perspective view of a vehicle of one embodiment of the present invention with the light bar of FIG. 20 interconnected thereto.
Figure 22:
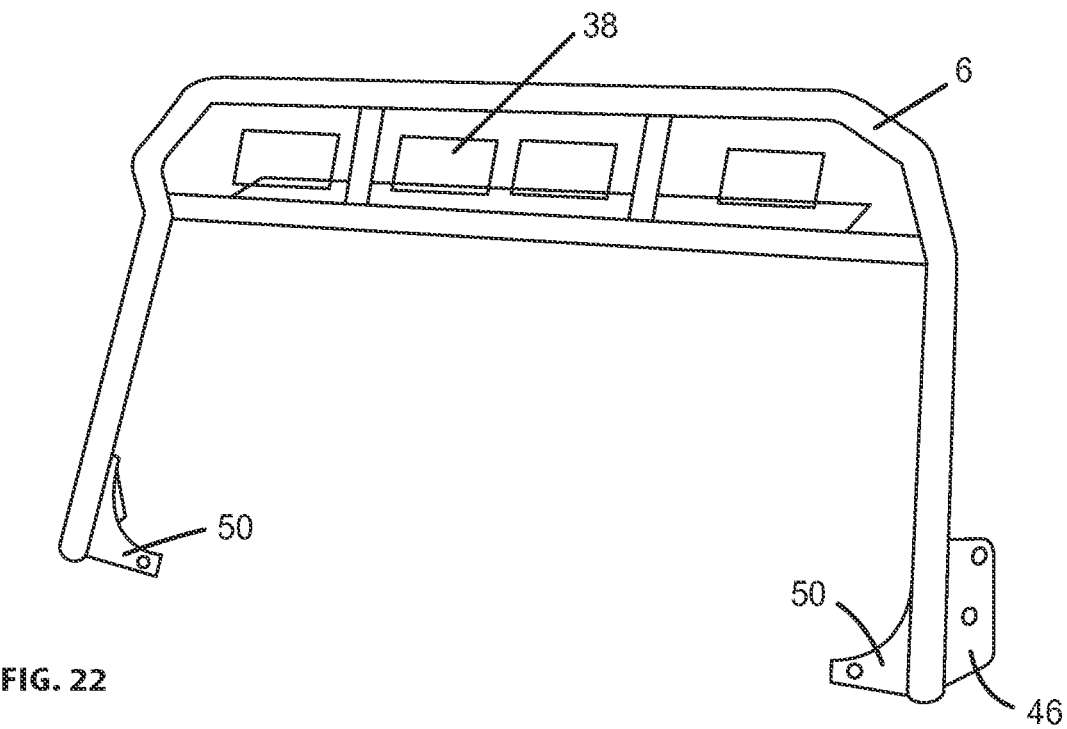
FIG. 22 is a perspective view of the light bar of FIG. 20 with lights of one embodiment interconnected thereto.
Figure 23:
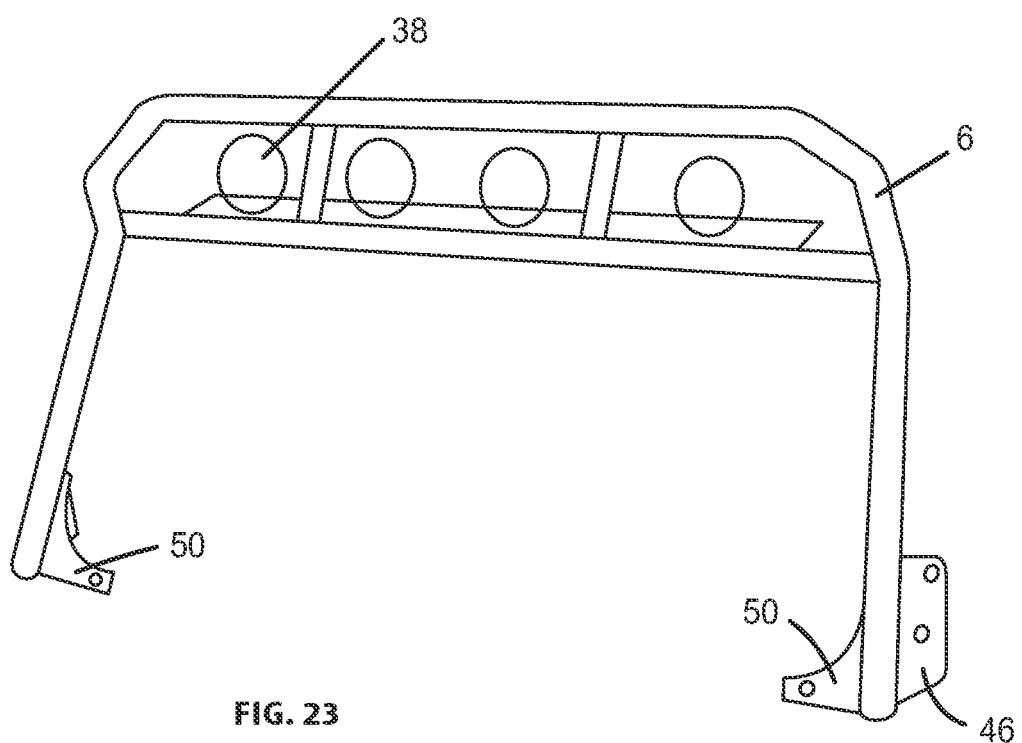
FIG. 23 is a perspective view of the light bar of FIG. 20 with lights of another embodiment interconnected thereto.
Figure 28:
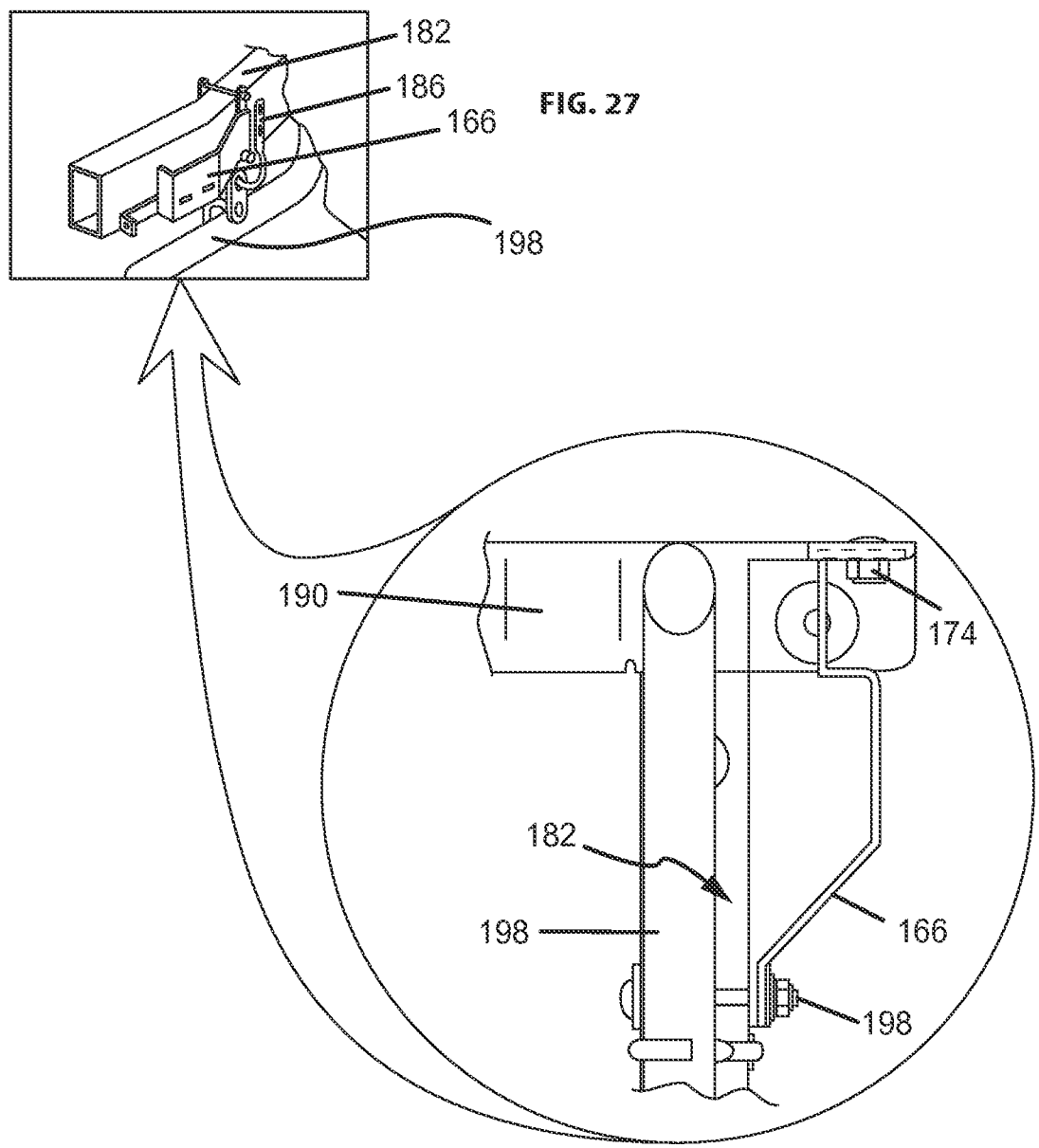
FIG. 28 is a bottom view of FIG. 27 showing the frame extension plate.
Figures 29, 30:
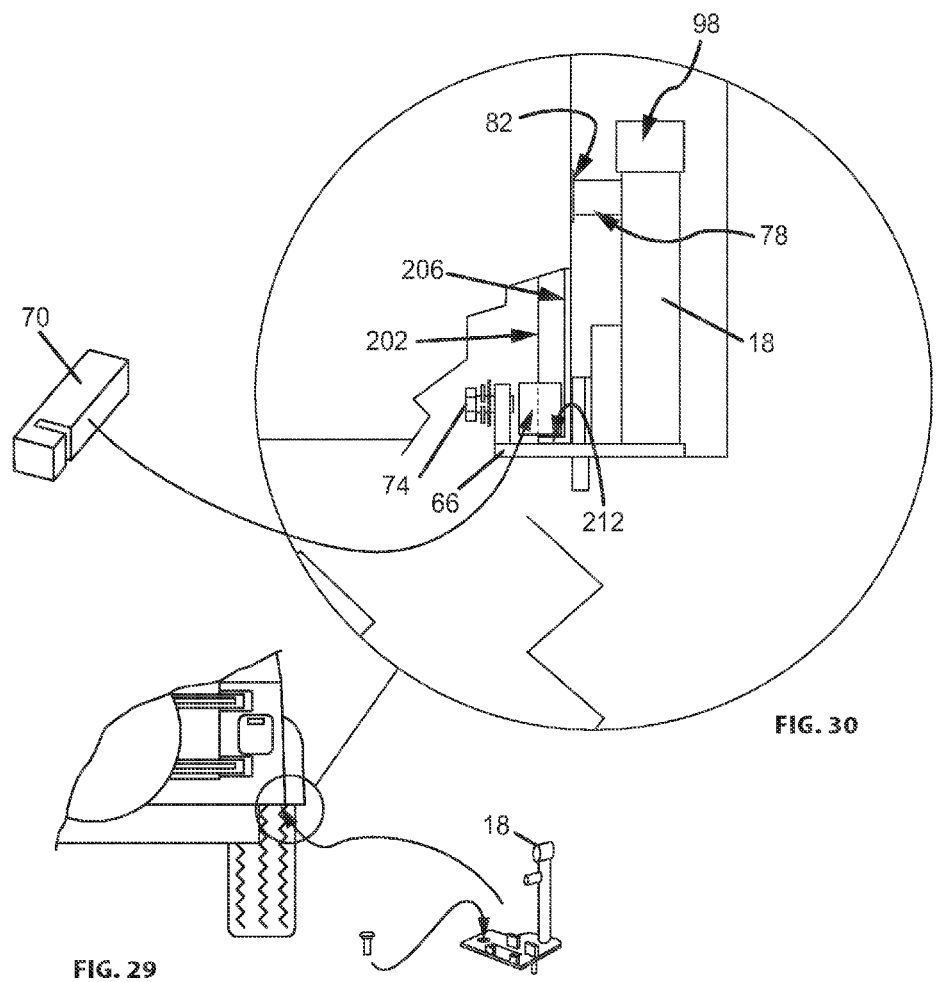
FIG. 29 is a rear elevation view of a vehicle showing the interconnection of the support tower to the vehicle.
FIG. 30 is a detailed view of FIG. 29.

FIG. 19 shows an optional ladder 154 interconnected to the roof rack system 2 of one embodiment of the present invention. The ladder 154 is interconnected to the roof rack 10 by way of a bracket 158 and to the support bar 14 such that the ladder 154 will travel with the roof rack 10 and the support bar 14. That is, as shown, the ladder 154 is interconnected solely to the roof rack 10 and associated support structure such that it moves with the roof rack. Those of skill in the art will appreciate, however, that the ladder 154 may be interconnected to vehicle and the roof rack 10 such that the user must disconnect the ladder 154 from the vehicle and/or the roof rack 10 prior to moving the roof rack 10. In addition, as the ladder 154 further interconnects the roof rack 10 to the support bar 14, enhanced stiffening is provided and sway is reduced. One of skill in the art will appreciate that the ladder 154 may be interconnected on the left side of the vehicle 22, the right side or two ladders may be provided. The contemplated ladder does not interfere with any moving or stationary part of the vehicle such as a swing gate tire carrier, rear tail lights, rear window openings, etc.

In order to accommodate some types of vehicles, a frame extension may be required, which is shown in FIGS. 24-30. That is, in some instances the vehicle is such that the support plate 86 (see FIG. 11) does not easily interface with the vehicle frame and an extension is required. The extension of comprised of a clamp plate 162 and a frame extension plate 166 that are interconnected to the vehicle's rear frame 182. In order to interconnect the frame extension plate 166, a rear bumper end cap 170 is removed from the rear bumper 190 by disengaging a lower nut and washer 174. The clamp plate 162 is then positioned behind the rear frame 182 and secured with carriage bolts 178 to the frame extension plate 166 by nuts and washers 198 threaded onto the carriage bolts 178. The clamp plate 162 is preferably positioned to the rear of the exhaust tail pipe support 186 proximate to the tail pipe 198. The frame extension plate 166 is also interconnected to the bumper bolt 194 with the lower nut and washer 174. In a preferred embodiment, NYLOK® nuts, i.e., locking nuts that include a nylon collar insert, are used to fasten the frame extension plate 166.

The frame extension plate 166 may be adjustably positioned to a desired distance away from the frame 182. In one embodiment, the spacing between the frame 182 and the frame extension plate 166 is 2-5/8 inches. Similar to the embodiments described above, the support tower 18 includes a clamp portion 66 that includes a pinch plate 70. The pinch plate 70 is positioned onto an inner body flange 202 such that it rests flush against the inner body sheet metal wall 206 and on a lower edge portion 212. In operation, tightening the screw 74 sandwiches the pinch plate 70 between the inner body sheet metal wall 202 and the clamp portion 66 to hold the support tower 18 in place. In embodiments of the present invention, the screw 74 is associated with lock washers and/or flat washers. To enhance the interconnection of the support tower 18 to the vehicle, a support plate (see FIG. 11) may be interconnected to the frame extension 166 and the support tower.

Figure 31:
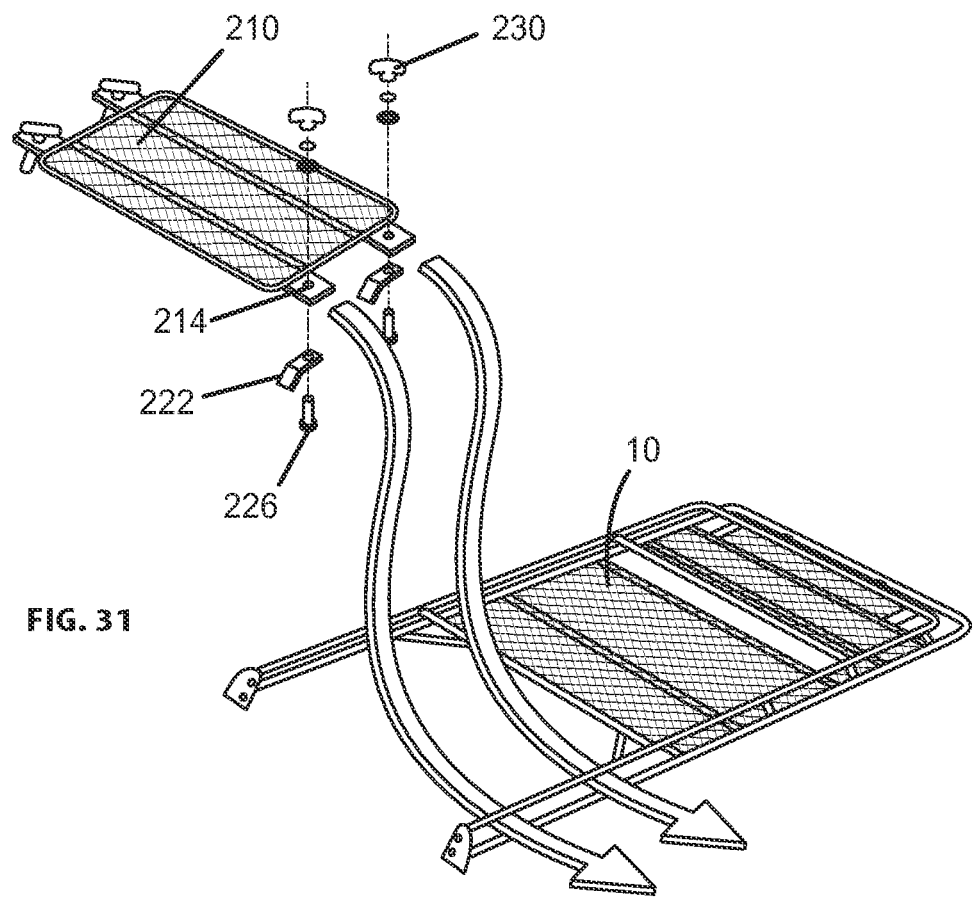
FIG. 31 is a perspective view of a sun roof insert that optionally interconnects to the roof rack.
Figure 32:
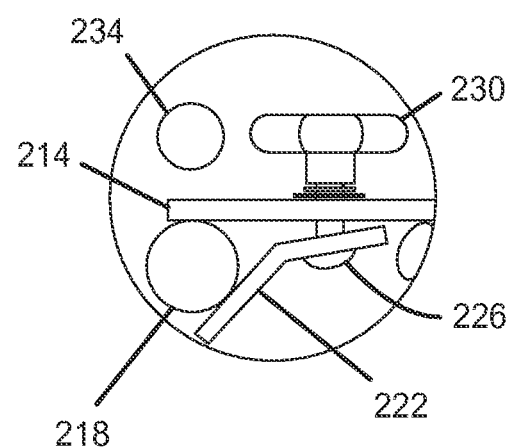
FIG. 32 is a detailed view of FIG. 31 showing the interconnection of the insert to the roof rack.

FIGS. 31 and 32 show a sunroof insert 210 for interconnection to the roof rack 10 adjacent to the location of a vehicle sunroof that provides additional storage space. The sun roof insert 210 of one embodiment of the present invention includes a plurality of ears 214 that engage a lower roof rack tube 218 of the roof rack 10. The ears 214 work in conjunction with a clamp 222 to interconnect the sun roof insert 210 to the roof rack 10. That is, the ears 214 and the clamp 222, with the bottom roof rack tube 218 therebetween, receive a bolt 226 that is hand-tightened by a knob 230 to affix the sunroof insert 210 to the roof rack 10. One of skill in the art will appreciate that other interconnection techniques and methods may be used without departing from the scope of the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. However, it is to be expressly understood that such modifications and alterations are within the scope and spirit of the present invention, as set forth in the following claims.

What is claimed is:

1. In combination a convertible roof rack and a vehicle comprising:
    a light bar interconnected to said vehicle adjacent to a windshield thereof;
    a first support tower interconnected to one end of a plate, wherein said second end of said plate includes a clamp portion comprising a pinch plate that is associated with a screw that selectively moves said pinch plate, and a vertical portion, which is interconnected to said plate, wherein said pinch plate engages a first portion of the vehicle body and works in concert with said vertical portion to secure said first support tower to said first portion of the vehicle body;
    a second support tower interconnected to one end of a plate, wherein said second end of said plate includes a clamp portion comprising a pinch plate that is associated with a screw that selectively moves said pinch plate, and a vertical portion, which is interconnected to said plate, wherein said pinch plate engages a second portion of said vehicle body and works in concert with said vertical portion to secure said second support tower to said second portion of said vehicle body;
    a roof rack rotatably interconnected on one end to said first and second means for supporting which has a first leg operably interconnected to said first support tower and a second leg operably interconnected to said second support tower, said roof rack being selectively interconnected on another end to said light bar;
    wherein said roof rack is capable of movement from a first position of use adjacent to the roof of said vehicle to a second position of use away from said roof while said first and second means for supporting remains associated with said vehicle; and
    wherein said light bar remains fixed to said vehicle regardless of the position of said roof rack.

2. The convertible roof rack of claim 1, further comprising a first support plate that interconnects the plate of said first support tower to a first portion of the vehicle frame and a second support plate that interconnects the plate of said second support tower to a second portion of said vehicle frame.

3. The convertible roof rack of claim 2, wherein said first support plate and said second support plate are interconnected to said vehicle by a plurality of bolts that utilize pre-existing holes that are incorporated in said vehicle frame.

4. In combination a convertible roof rack and a vehicle, comprising:
    a light bar interconnected to said vehicle adjacent to a windshield thereof;
    a first support tower interconnected to a first portion of the vehicle body adjacent to a rear surface of said vehicle and positioned on a left lateral side of said vehicle, said first support tower having an isolator extending laterally therefrom that is associated with said left lateral side of said vehicle, said first support tower interconnected to one end of a plate, wherein said second end of said plate includes a clamp portion comprising a pinch plate that is associated with a screw that selectively moves said pinch plate, and a vertical portion, which is interconnected to said plate, wherein said pinch plate engages said first portion of said first portion of the vehicle body of said vehicle and works in concert with said vertical portion to secure said first support tower to said first portion of the vehicle body;
    a second support tower interconnected to a second portion of the vehicle body adjacent to a rear surface of said vehicle and positioned on a right lateral side of said vehicle, said second support tower having an isolator extending laterally therefrom that is associated with said right lateral side of said vehicle, said second support tower interconnected to one end of a plate, wherein said second end of said plate includes a clamp portion comprising a pinch plate that is associated with a screw that selectively moves said pinch plate, and a vertical portion, which is interconnected to said plate, wherein said pinch plate engages said second portion of the vehicle body and works in concert with said vertical portion to secure said second support tower to said second portion of the vehicle body;
    a support bar having a first leg positioned on said left lateral surface of said vehicle and operably interconnected to said first support tower and a second leg positioned on said right lateral surface of said vehicle and operably interconnected to said second support tower;
    a roof rack interconnected on one end to said support bar between said first leg and said second leg, said roof rack being selectively interconnected on another end to said light bar; and
    wherein said roof rack is capable of movement from a first position of use adjacent to the roof of said vehicle to a second position of use away from the roof of said vehicle while said light bar remains interconnected to the vehicle.

5. The combination of claim 1, further comprising at least one of a light, speakers, and signs interconnected to said light bar.

6. The combination of claim 1, comprising a ladder interconnected to said roof rack.

7. The combination of claim 6, wherein said ladder is interconnected solely to said roof rack such that it travels with said roof rack from said first position to said second position.

8. The combination of claim 1, wherein the light bar further comprises a plurality of brackets which are adapted for interconnection with a windshield frame located adjacent to the windshield.

9. The combination of claim 1, further comprising a first wear plate interconnected to the vehicle with an adhesive and associated with said first load isolating member and a second wear plate interconnected to said vehicle with adhesive and associated with said second load isolating member.

10. The combination of claim 1, further comprising: a first support plate interconnecting at least one of said clamp and said plate of said first support tower to first portion of a frame of the vehicle and a second support plate interconnecting at least one of said clamp and said plate of said second support tower to a second portion of said frame.

11. The combination of claim 1, wherein a front surface of said roof rack is located behind said light bar when said roof rack is in a first position of use.

* * * * *

UNITED STATES PATENT AND TRADEMARK OFFICE
CERTIFICATE OF CORRECTION

PATENT NO. : 8,496,146 B2  
APPLICATION NO. : 12/861034  
DATED : July 30, 2013  
INVENTOR(S) : Paul Badillo Page 1 of 1

It is certified that error appears in the above-identified patent and that said Letters Patent is hereby corrected as shown below:

In the Claims:

In column 9, line 39, replace "means for supporting" with -- support towers --.
In column 9, line 47, replace "means for supporting remains" with -- support towers remain --.
In column 10, line 41, replace "claim 1" with -- claim 4 --.
In column 10, line 44, replace "claim 1" with -- claim 4 --.
In column 10, line 48, replace "claim 1" with -- claim 4 --.
In column 10, line 53, replace "claim 1" with -- claim 4 --.
In column 10, line 58, replace "claim 1" with -- claim 4 --.
In column 10, line 63, replace "claim 1" with -- claim 4 --.

Signed and Sealed this  
Twenty-sixth Day of November, 2013

Margaret A. Focarino  
*Commissioner for Patents of the United States Patent and Trademark Office*